(12) United States Patent
Cohen et al.

(10) Patent No.: US 11,044,213 B2
(45) Date of Patent: Jun. 22, 2021

(54) SYSTEMS AND METHODS FOR INVISIBLE IDENTIFICATION OF AGENTS PARTICIPATING IN ON-LINE COMMUNICATION SESSIONS

(71) Applicant: Nice Ltd., Ra'anana (IL)

(72) Inventors: Yaron Cohen, Modiin (IL); Tai Kashi, Hod-Hasharon (IL); Dror Eyal, Tel-Aviv Jaffa (IL)

(73) Assignee: Nice Ltd., Ra'anana (IL)

(*) Notice: Subject to any disclaimer, the term of this patent is extended or adjusted under 35 U.S.C. 154(b) by 53 days.

(21) Appl. No.: 15/846,835

(22) Filed: Dec. 19, 2017

(65) Prior Publication Data

US 2019/0190860 A1 Jun. 20, 2019

(51) Int. Cl.
*H04L 12/58* (2006.01)
*H04M 3/51* (2006.01)
*H04M 3/42* (2006.01)
*G06Q 30/00* (2012.01)

(52) U.S. Cl.
CPC .............. *H04L 51/04* (2013.01); *H04L 51/16* (2013.01); *H04M 3/42382* (2013.01); *H04M 3/5175* (2013.01); *G06Q 30/016* (2013.01); *H04M 3/5191* (2013.01)

(58) Field of Classification Search
CPC ...... H04L 51/04; H04L 51/16; H04M 3/5175; H04M 3/5191; G06Q 30/016
See application file for complete search history.

(56) References Cited

U.S. PATENT DOCUMENTS

| | | | | |
|---|---|---|---|---|
| 6,966,029 B1* | 11/2005 | Ahern | ............... | G06F 40/163 715/234 |
| 7,188,358 B1* | 3/2007 | Hisada | ............... | H04L 51/12 709/223 |
| 7,783,711 B2* | 8/2010 | LeVasseur | ............ | H04L 63/123 709/206 |
| 10,003,964 B1* | 6/2018 | Blintsov | ............ | H04L 63/0442 |
| 2002/0059193 A1* | 5/2002 | Decime | ............... | G06Q 10/10 |
| 2004/0001606 A1* | 1/2004 | Levy | ............... | G06T 1/0021 382/100 |
| 2004/0179684 A1* | 9/2004 | Appenzeller | ............ | H04L 9/0861 380/44 |
| 2005/0091072 A1* | 4/2005 | Dunn | ............... | G06Q 10/10 705/1.1 |
| 2007/0118904 A1* | 5/2007 | Goodman | ............... | H04L 51/12 726/22 |
| 2012/0317205 A1* | 12/2012 | Lahiani | ............... | H04L 67/18 709/206 |
| 2012/0324003 A1* | 12/2012 | Armstrong | ............ | H04L 65/403 709/204 |
| 2013/0139268 A1* | 5/2013 | An | ............... | H04L 63/1441 726/26 |
| 2013/0218983 A1* | 8/2013 | Richard | ............... | H04L 51/28 709/206 |
| 2017/0329943 A1* | 11/2017 | Choi | ............... | G06F 21/602 |

* cited by examiner

*Primary Examiner* — Dhairya A Patel
*Assistant Examiner* — Sujana Khakural
(74) *Attorney, Agent, or Firm* — Pearl Cohen Zedek Latzer Baratz LLP

(57) ABSTRACT

A computerized-method for identification of a particular agent within a contact center that participates in an on-line chat session with a customer is provided. An on-line chat system can receive a request from the customer to initiate the on-line chat session. An invisible identifier can be inserted into a message for the online-chat session that uniquely identifies a particular agent handling the chat.

14 Claims, 3 Drawing Sheets

SYSTEMS AND METHODS FOR INVISIBLE IDENTIFICATION OF AGENTS PARTICIPATING IN ON-LINE COMMUNICATION SESSIONS

FIELD OF THE INVENTION

The invention relates generally to on-line interaction recording systems. In particular, the invention relates to identifying agents during on-line communication sessions (e.g., on-line chat and/or instant messaging).

BACKGROUND OF THE INVENTION

Currently, online chat applications (e.g., messaging applications) have been widely adopted by customer contact centers worldwide to, for example, enable prompt communications with customers. Prompt communication with customers can allow an improved customer experience, typically causing high rates of user satisfaction.

Typically, contact centers can perform quality management by using computing tools to analyze the customer interactions. Typical quality management analysis can require recording and archiving of the communication between an agent and a customer and/or identifying a particular agent that handled the communication.

However, for communications that occur via on-line chat and/or instant messaging applications, although the conversation for these applications is typically recorded, an identity of the agent for many on-line chat tools is not recorded. For example, currently Facebook Messenger® can allow for transcripts of chat sessions to be retrieved from Facebook's website, however while the transcript of the chat session typically includes customer identification information, the transcript typically does not include information on identity of the agent who was participating in the chat session. Instead, the transcript typically includes one global participant identifier for all chat sessions associated with a particular business' Facebook page.

Lack of an ability to identify an agent in recordings of communication sessions can result in an inability to perform quality management analysis on a per-agent basis for on-line chat application communication sessions between agents and customers.

SUMMARY OF THE INVENTION

One advantage of the invention can include an ability to add an agent identifier in a chat and/or messaging application without modifying the chat and/or messaging application. Another advantage of the invention can include improved quality management analysis of chat and/or messaging sessions between agents and customers.

In one aspect, the invention involves a computerized-method for identification of a particular agent within a contact center that participates in an on-line chat session with a customer. The method can involve receiving, via an on-line chat system running on a computer, a request from the customer to initiate the on-line chat session. The method can also involve generating, via the computer, a message for the on-line chat session. The method can also involve inserting, via the computer, an identifier into the message that is not viewable by any participants in the on-line chat session the identifier uniquely identifies the particular agent of a plurality of agents that participates in the online-chat session. The method can also involve transmitting, via the on-line chat application running on the computer, the message with the invisible identifier to the customer.

In some embodiments, the message is an automated and customized greeting message containing the invisible identifier. In some embodiments, the identifier is a sequence of characters that are invisible in text. In some embodiments, the method involves storing, the on-line chat session, including the message having the identifier.

In some embodiments, the on-line chat system does not provide an agent identifier.

In another aspect, the invention involves a computerized-method for identification of a particular agent within a contact center that participates in an on-line chat session with a customer. The method can also involve retrieving, via a computer, a transcript of an on-line chat session. The method can also involve identifying, via the computer, a string of a plurality of strings in the on-line chat session having a sequence of characters that are invisible in text. The method can also involve extracting, via the computer, the sequence of characters that are invisible in text from the identified string. The method can also involve converting, via the computer, the sequence into a number in any format to identify the particular agent.

In some embodiments, the plurality of strings in the on-line chat session is a transcript of the on-line chat session. In some embodiments, the textually invisible characters are tabs, spaces or any other ASCII characters invisible in text and any combination thereof.

In another aspect, the invention includes one or more non-transitory computer-readable storage media comprising instructions that are executable to cause one or more processors to receive a request from the customer to initiate the on-line chat session, generate a message for the on-line chat session, insert an identifier into the message that is not viewable by any participants in the on-line chat session the identifier uniquely identifies the particular agent of a plurality of agents that participates in the online-chat session, and transmit the message with the invisible identifier to the customer.

In some embodiments, the one or more non-transitory computer-readable storage media of claim 9 wherein the message is an automated and customized greeting message containing the invisible identifier. In some embodiments, the one or more non-transitory computer-readable storage media of claim 9 wherein the identifier is a sequence of characters that are invisible in text.

In some embodiments, the one or more non-transitory computer-readable storage media of claim 9 where the instructions when executed further cause one or more processors store including the message having the identifier.

In some embodiments, the one or more non-transitory computer-readable storage media of claim 9 wherein the on-line chat system does not provide an agent identifier. In some embodiments, the one or more non-transitory computer-readable storage media of claim 9 where the instructions when executed further cause one or more processors to retrieve a transcript of an on-line chat session, identify a string of a plurality of strings in the on-line chat session having a sequence of characters that are invisible in text, extract the sequence of characters that are invisible in text from the identified string, and convert the sequence into a number in any format to identify the particular agent.

In some embodiments, the one or more non-transitory computer-readable storage media of claim 13 wherein the plurality of strings in the on-line chat session is a transcript of the on-line chat session. In some embodiments, the one or more non-transitory computer-readable storage media of claim 13 wherein the textually invisible characters are tabs, spaces or any other ASCII characters invisible in text and any combination thereof.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1:
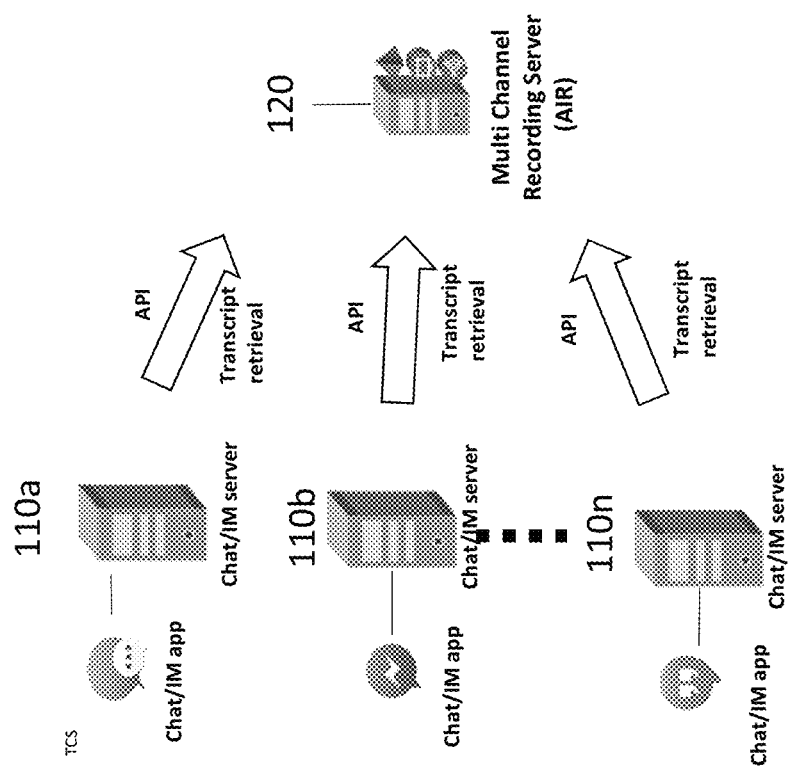
FIG. 1 is a diagram of a system for identification of a particular agent in an on-line chat session, according to an illustrative embodiment of the invention.

FIG. 1 is a diagram of a system for identification of a particular agent in an on-line chat session, according to an illustrative embodiment of the invention. The system includes a plurality of on-line chat applications 110a, 110b, . . . 110n, generally 110, a recording server 120, and a plurality of contact center server (not shown).

The recording server 120 can interface with the chat application servers 110 to retrieve chat transcripts from the chat application servers 110. The chat application server 110 can insert an invisible identifier into each on-line chat session to uniquely identify an agent participant in each chat. As is apparent to one of ordinary skill in the art, the user device and server configuration shown herein is for example purposes and that multiple servers can be hosted on one server or any combination of servers.

Upon receipt of a request for a chat from a customer via one of the on-line chat applications 110, the chat application server 110 can launch a chat session via a chat application that is the same chat applications as the customer's. An agent connected to one of the chat application servers 110 can chat with the customer via the chat application running on the corresponding chat application server 110. The server 110 can insert a unique identifier into the chat transcript to uniquely identify the agent participating in the chat. In this manner, the agent can be later identified during quality management analysis.

Each of the on-line chat applications 110 can run on separate user devices (e.g., personal computer, laptop, smart phone, etc.), on the same user device, or any combination thereof. The on-line chat applications can include any on-line chat application, including publicly available chat applications, messenger applications, email applications, texting applications, or any combination thereof. The recording server 120 can retrieve from chat application server 110 interactions of a group of corresponding agents.

Figure 2:
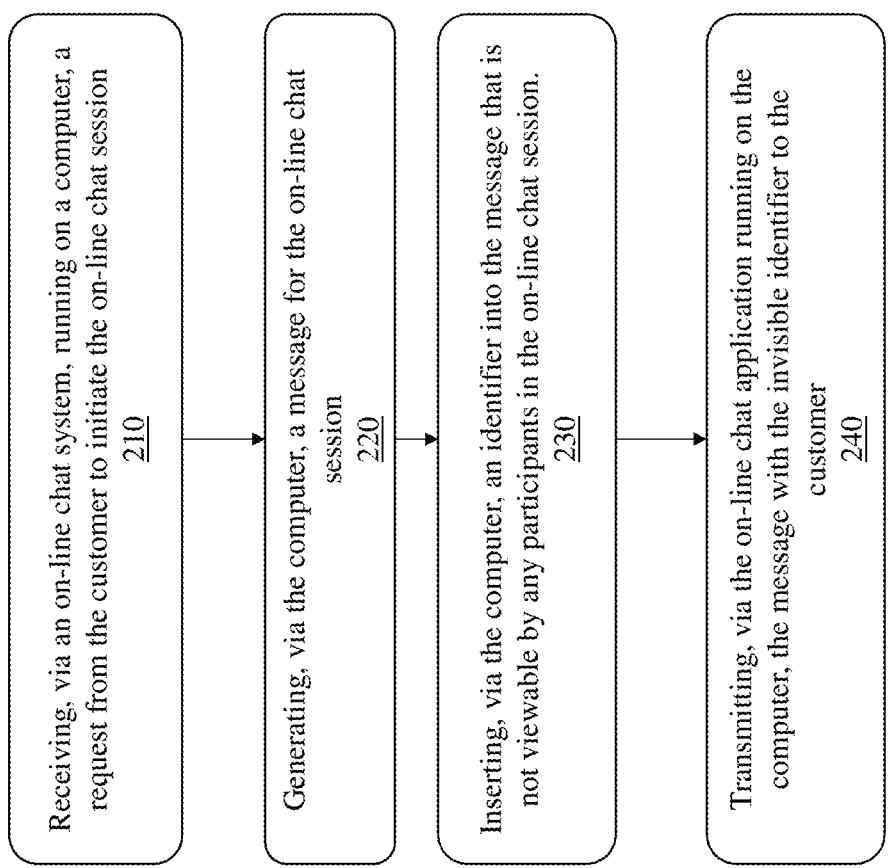
FIG. 2 is a flow chart of a method for identification of a particular agent within a contact center that participates in an on-line chat session with a customer, according to an illustrative embodiment of the invention.

FIG. 2 is a flow chart of a method for identification of a particular agent within a contact center that participates in an on-line chat session with a customer, according to an illustrative embodiment of the invention. The method can involve receiving, via an on-line chat system running on a computer (e.g., computer 110 as described above in FIG. 1), a request from the customer to initiate the on-line chat session (Step 210). For example, a customer using on-line chat application (e.g., on-line chat application 110 as described above in FIG. 1) requests an on-line chat session with an agent (e.g., by selecting 'start on-line chat' icon on a webpage of an agent's business). In some embodiments, the request is a message sent via the on-line chat application by the customer (e.g., user types in an on-line chat application 'hello, I would like to talk to an agent').

The method can also involve generating, via the computer (e.g., server 110 as described above in FIG. 1), a message for the on-line chat session (Step 220). The message can be from the agent to the customer in response to the request. The message can be an automated greeting message with a predefined and/or fixed structure (e.g., "Hello, this is Paula, how may I help you today?"). The message can be any message that the agent types.

The method can also involve inserting, via the computer, an identifier into the message that is not viewable by any participants in the on-line chat session (Step 230). The identifier can uniquely identify the particular agent of a plurality of agents in a contact center, that participates in the online-chat session. For example, assume there are fifty agents in a contact center, and an on-line chat is initiated between a customer and one of the fifty agents. A unique identifier can be assigned to the one of the fifty agents participating in the chat. If a second on-line chat is initiated between a second customer and a different agent of the fifty agents, then a unique identifier can be assigned to the different agent of the fifty agents. Each agent of the fifty agents can have unique identifiers assigned during on-line chats. The unique identifier can be used for the particular agent in any correspondence via chat. Thus, in this manner, each agent within fifty agents can have a unique identifier assigned and/or different customers having chats with the same agent can have the same agent identifier.

The unique identifier can include a character or a sequence of characters that are not visible within the text of the message. The sequence of characters can include a string of tabs, spaces and/or any other ASCII characters that are not viewable (e.g., visible) in text. Each sequence of characters can be mapped to a logic representation of 1's and 0's. For example, each agent can be mapped to a unique identifier value. Table 1 is an example of an agent identifier of an agent email mapped to a unique invisible identifier value.

TABLE 1

| Agent Email | Invisible identifier value |
|---|---|
| Mary@nice.com | [123] |
| Amy@nice.com | [1110] |
| Jane@nice.com | [1929] |

In some embodiments, the agent identifier is an internet protocol address of a computing device used by the agent.

Each invisible identifier value can be mapped to a series of 1's and 0's. Table 2 is an example of the invisible identifier value mapped to a series of 1's and 0's.

TABLE 2

| Invisible Identifier Value | Series of 1's and 0's |
|---|---|
| [123] | 1111011 |
| [1110] | 10001010110 |
| [1929] | 11110001001 |

Each series of 1's and 0's can be mapped to invisible characters. For example, assume that 1 is mapped to tab, and 0 is mapped to space, table 3 shows a corresponding invisible string of characters, where T=Tab and S=Space and "0" represented by "Tab" and "1" by "Space".

TABLE 3

| Series of 1's and 0's | Invisible String of Characters |
|---|---|
| 1111011 | [SSSSTSS] |
| 10001010110 | [STTTSTSTSST] |
| 11110001001 | [SSSSTTTSTTS] |

Continuing with the example above, as shown in Table 1, Table 2, and Table 3, assume that a customer initiates an on-line chat session with an agent named "Mary". The invisible string of characters (e.g., the unique invisible identifier) [TTTSTTSTTTSS] can be inserted onto the end of the message "Hello, this is Mary, how may I help you". Thus, in this example, the ASCII characters in the message sent to the user are "Hello, this is Mary, how may I help you [TTTSTTSTTTSS]", while the customer and the agent viewing the on-line chat session do not see the invisible identifier. In this manner, a unique identifier of an agent can be inserted into the on-line chat message without modifying the on-line chat messaging application and/or without showing the unique identifier to the agent or the customer during the chat.

In some embodiments, an invisible identifier pattern can be inserted into the message. The invisible identifier pattern can include an invisible prefix and/or suffix that can be included with the invisible agent identifier. For example, an invisible identifier pattern can be: [Invisible Prefix] [Invisible Agent Identifier] [Invisible Suffix].

The invisible prefix can be a pattern that assists in identifying the start of the invisible agent identifier characters in the message. The invisible suffix can be a pattern that assists in identifying an end of the invisible agent identifier characters in the message. The invisible prefix and/or suffix can be input by a user, specified by an administrator, and/or any combination thereof. For example, the invisible prefix can be [TabSpaceTabSpace], the invisible suffix can be [TabSpaceTabSpace]. Assume in this example an invisible agent identifier of [SpaceSpaceTabTab], the string of characters inserted into the message is [TabSpaceTabSpace SpaceSpaceTabTabTabSpaceTabSpace]. The prefix and/or suffix can be any number of invisible characters and any invisible ASCII character.

In some embodiments, the message is an automated and customized greeting message containing the invisible identifier. For example, the message can be automatically generated based on the agent's identifier (e.g., email address and/or IP address as described above), the prefix, the suffix, or any combination thereof.

The method also involves transmitting, via the on-line chat application running on the computer, the message with the invisible identifier to the customer (Step 240).

In some embodiments, the method also includes storing the on-line chat session, including the message having the identifier. In this manner, the message including the invisible identifier can be stored such that the invisible identifier can be used to identify the particular agent participant of the chat.

Figure 3:
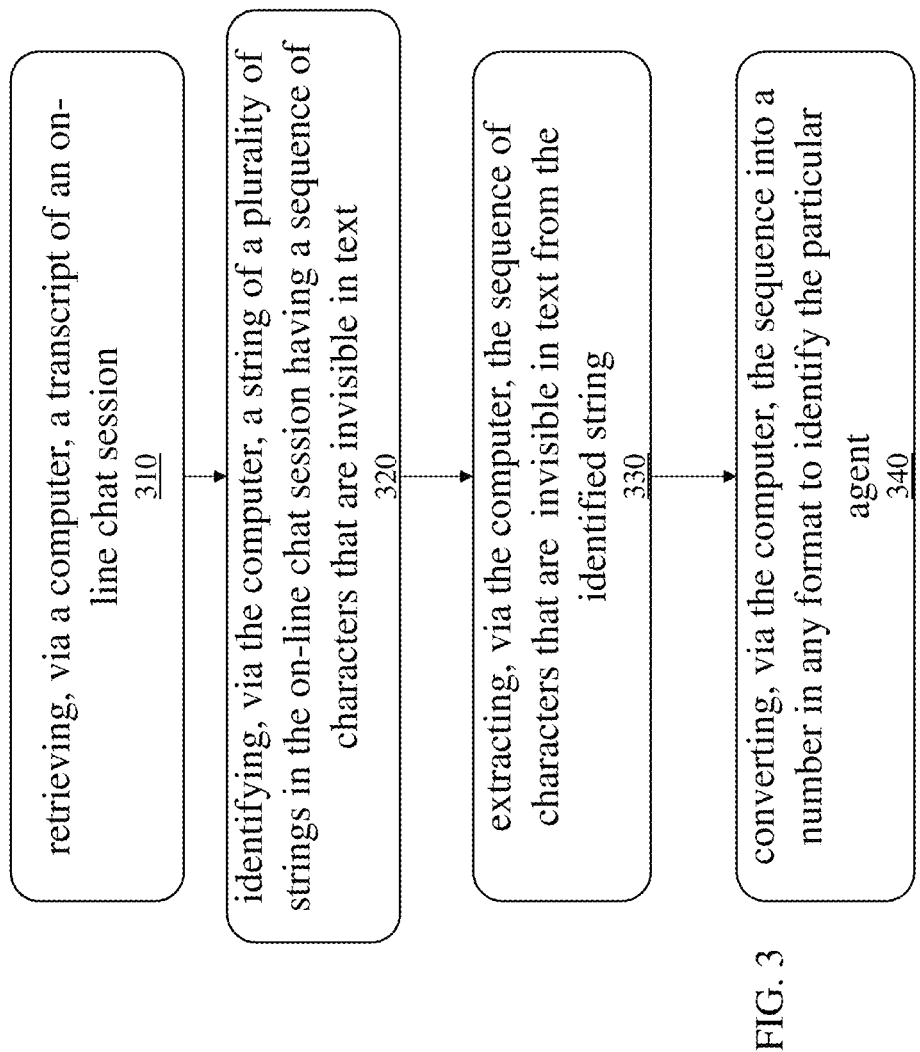
FIG. 3 is a flow chart of a method for identification of a particular agent within a contact center that participates in an on-line chat session with a customer, according to an illustrative embodiment of the invention.

FIG. 3 is a flow chart of a method for identification of a particular agent within a contact center that participates in an on-line chat session with a customer, according to an illustrative embodiment of the invention. The method can include retrieving, via a computer, a transcript of an on-line chat session (Step 310). The transcript can be a transcript as stored in an on-line chat application's server or in any storage location as is known in the art.

The method can also include identifying, via the computer, a string of a plurality of strings in the on-line chat session having a sequence of characters that are invisible in text (Step 320). The plurality of strings can be a transcript of a previously recorded on-line chat session. The string in the plurality of strings can be identified by searching for a string that includes a series of invisible characters. In various embodiments, the string in the plurality of strings can be identified based on a prefix and/or a suffix (e.g., the invisible prefix and/or suffix as described above in FIG. 2).

The method can also include extracting, via the computer, the sequence of characters that are invisible in text from the identified string (Step 330). In some embodiments, the sequence of characters is the unique invisible agent identifier. In various embodiments, the sequence of characters is the unique invisible agent identifier, the prefix, and/or the suffix. In embodiments where the prefix and/or the suffix are present, the prefix and/or suffix are removed from the sequence of characters, such that the remaining characters are the unique invisible agent identifier. In some embodiments, the string of the plurality of strings and the unique invisible agent identifier is extracted from the string as shown in Table 4 below:

TABLE 4

```
private int ParseLine(string line)
{
    Regex regex = new Regex("\t \t ([ \t]+)");
    Match match = regex.Match(line);
    if (match.Success)
    {
        return ExtractAgentId(match.Groups[1].Value);
    }
    return 0;
}
private int ExtractAgentId (string match)
{
```

TABLE 4-continued

```
        string newStr = match.Replace(' ', '1').Replace('\t', '0');
        return Convert.ToInt32(newStr, 2);
    }
```

The method also includes converting, via the computer, the sequence into a number in any format to identify the particular agent (Step 340). The invisible characters can be mapped to binary numbers based on a previously defined map, for example, the mapping as is done during creation of the invisible characters that are inserted in the message during the on-line chat session as described above with respect to FIG. 2. The binary numbers can be converted into whole numbers based on a previously defined map, for example, the mapping as is done during creation of the invisible characters that are inserted in the message during the on-line chat session as described above with respect to FIG. 2. The binary number, the whole number or any combination thereof can be associated with a particular agent. In this manner, the invisible characters can allow for an agent to be identified.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes. Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A computerized-method for identification of a particular agent within a contact center that participates in an on-line chat session with a customer, the method comprising:

receiving, via an on-line chat system running on a computer, a request from the customer to initiate the on-line chat session;

generating, via the computer, a message for transmission to the customer in the on-line chat session;

inserting, via the computer, an invisible identifier into the text of the message that is not viewable by any participants in the on-line chat session,
 wherein the invisible identifier comprising a string of a plurality of strings in the on-line chat session having a sequence of characters that are invisible in text;
 wherein the invisible identifier is mapped to an agent identifier and uniquely identifies the particular agent of a plurality of agents that participates in the online-chat session; and
 wherein the invisible identifier is different from the agent identifier;

transmitting, via the on-line chat application running on the computer, the message with the invisible identifier to the customer;

storing the message with the invisible identifier by the on-line chat system, without modifying a transcript storing function of the on-line chat system;

retrieving, via the computer, a transcript of the on-line chat session;

identifying, via the computer, in the text of the message transmitted to the customer in the transcript, the invisible identifier;

extracting, via the computer, the sequence of characters that are invisible in text from the identified string; and converting, via the computer, the sequence into a number in any format to identify the particular agent using the agent identifier.

2. The computerized-method of claim 1, wherein the message is an automated and customized greeting message containing the invisible identifier.

3. The computerized-method of claim 1, wherein the on-line chat system does not provide an agent identifier.

4. The computerized-method of claim 1 wherein the plurality of strings in the on-line chat session is a transcript of the on-line chat session.

5. The computerized-method of claim 1 wherein the characters that are invisible in text are tabs, spaces or any other ASCII characters invisible in text and any combination thereof.

6. The computerized-method of claim 1, wherein the identifier is a string of tabs, spaces, or any combination thereof.

7. The computerized-method of claim 1, wherein the sequence is mapped to a logical representation of 1's and 0's.

8. One or more non-transitory computer-readable storage media comprising instructions for identification of a particular agent within a contact center that participates in an on-line chat session with a customer that are executable to cause one or more processors to:
  receive a request from the customer to initiate the on-line chat session;
  generate a message for transmission to the customer in the on-line chat session via an online chat system;
  insert an invisible identifier into the text of the message that is not viewable by any participants in the on-line chat session,
    wherein the invisible identifier comprising a string of a plurality of strings in the on-line chat session having a sequence of characters that are invisible in text,
    wherein the invisible identifier is mapped to an agent identifier and uniquely identifies the particular agent of a plurality of agents that participates in the online-chat session, and
    wherein the invisible identifier is different from the agent identifier;
  transmit the message with the invisible identifier to the customer;
  store the message with the invisible identifier by the on-line chat system, without modifying a transcript storing function of the on-line chat system;
  retrieve a transcript of the on-line chat session
  identify in the text of the message transmitted to the customer in the transcrip, the invisible indentifier;
  extract the sequence of characters that are invisible in text from the identified string; and
  convert the sequence into a number in any format to identify the particular agent using the agent identifier.

9. The one or more non-transitory computer-readable storage media of claim 8 wherein the message is an automated and customized greeting message containing the invisible identifier.

10. The one or more non-transitory computer-readable storage media of claim 8 wherein the plurality of strings in the on-line chat session is a transcript of the on-line chat session.

11. The one or more non-transitory computer-readable storage media of claim 8 wherein the characters that are invisible in text are tabs, spaces or any other ASCII characters invisible in text and any combination thereof.

12. The one or more non-transitory computer-readable storage media of claim 8, wherein the on-line chat system does not provide an agent identifier.

13. The one or more non-transitory computer-readable storage media of claim 8, wherein the identifier is a string of tabs, spaces, or any combination thereof.

14. The one or more non-transitory computer-readable storage media of claim 8, wherein the sequence is mapped to a logical representation of 1's and 0's.

* * * * *